United States Patent [19]

Ellis et al.

[11] 4,092,174
[45] May 30, 1978

[54] PHOTOCHROMIC GLASSES

[75] Inventors: Edric Ellis, Ormskirk; Richard Gelder, Preston; Allan Hale, Upholland, Nr. Wigan, all of England

[73] Assignee: Pilkington Brothers Limited, St. Helens, England

[21] Appl. No.: 836,116

[22] Filed: Sep. 21, 1977

Related U.S. Application Data

[63] Continuation-in-part of Ser. No. 764,313, Jan. 31, 1977, abandoned.

[30] Foreign Application Priority Data

Jan. 30, 1976 United Kingdom ............... 3814/76
Apr. 8, 1976 United Kingdom ............... 14415/76

[51] Int. Cl.² .................... C03C 3/26; C03C 3/08; C03C 3/10
[52] U.S. Cl. ................. 106/53; 106/DIG. 6; 106/47 Q; 106/54
[58] Field of Search ............. 106/53, 54, DIG. 6, 106/47 Q

[56] References Cited

U.S. PATENT DOCUMENTS 3,876,436  4/1975  Lythgoe .................. 106/DIG. 6

Primary Examiner—Winston A. Douglas
Assistant Examiner—Mark Bell
Attorney, Agent, or Firm—Sughrue, Rothwell, Mion, Zinn and Macpeak

[57] ABSTRACT

Fast-response alumino-phosphate photochromic glasses having silver halide crystals dispersed throughout the glass consisting essentially of, in weight percentages:

$SiO_2$: 8.5 to 25%, $Al_2O_3$: 13 to 36.5%, $P_2O_5$: 7.5 to 33.5%, $B_2O_3$: 7 to 28%; $R_2O$: 7 to 20.5%, R'O:0 to 21%, $TiO_2$: 0 to 6%, $ZrO_2$: 0 to 10%, PbO:0 to 8%, where $R_2O$ represents at least one of $Na_2O$, $K_2O$ and $Li_2O$, the maximum content of LiO being 5%; and R'O represents at least one of MgO,CaO,SrO and BaO, within the following individual limits: MgO: 0 to 4%, CaO: 0 to 6.5%, SrO: 0 to 10%, BaO: 0 to 21%; the amount of $SiO_2$ is not less than 16% when the $B_2O_3$ content is less than 8%; and the silver content of the glass, expressed as $Ag_2O$, is not less than 0.05% by weight.

Such glasses in which $Al_2O_3$ is the largest constituent are preferred for ophthalmic purposes, but it is also possible for either $B_2O_3$ or $P_2O_5$ to be the largest constituent. The refractive index can be corrected to $n_D$ = 1.523.

11 Claims, No Drawings

PHOTOCHROMIC GLASSES

This application is a continuation-in-part of our application Ser. No. 764,313 filed Jan. 31, 1977, now abandoned.

BACKGROUND OF THE INVENTION

Field of the Invention

This invention relates to photochromic glasses, i.e. to glass compositions which darken on exposure to actinic radiation and fade back to their original, normally colourless, state when no longer exposed.

This invention relates to photochromic glasses, i.e. to glass compositions which darken on exposure to actinic radiation and fade back to their original, normally colourless, state when no longer exposed.

In our British patent specification No. 1367903, we have described and claimed a range of photochromic glasses comprising at least 17% by weight $P_2O_5$ as one of the glass forming components, with silver halide crystals dispersed throughout the glass, the total silver content of the glass being at least 0.05% by weight Ag. The specific glasses disclosed in that Specification are alumino-phosphate glasses comprising not more than 40% by weight $SiO_2$ and between 9% and 34% by weight $Al_2O_3$ as further glass forming components, and at least 10% by weight $R_1O$, where R=K, Na or Li. They can also contain up to 19% by weight $B_2O_3$, though most of the glasses disclosed contain no more than 3 to 7% $B_2O_3$.

Glasses falling with the claims of British Patent 1367903 are now used in the manufacture of ophthalmic lenses for both sunglasses and prescription spectacles. These alumino-phosphate glasses, like the photochromic borosilicate glasses also available in the market, while exhibiting desirable photochromic properties, have relatively slow responses to exposure and removal of actinic radiation, i.e. slow darkening and fading rates. It is desirable, particularly for ophthalmic purposes, to have glasses with faster responses, particularly a faster fading rate. A rapid fading rate is desirable to aid in adjustment to a sudden decrease in available light, such as when a wearer of spectacles with lenses of photochromic glass enters a dimly-lit room.

SUMMARY OF THE INVENTION

An object of the present invention is to provide a range of photochromic glasses having improved properties and in particular glasses which provide an improved combination of photochromic effect (measured as the induced optical density or change in light transmission when irradiated with actinic radiation) and speed of response to irradiation or removal of radiation.

According to the present invention, a photochromic alumino-phosphate glass having silver halide crystals dispersed throughout the glass consists essentially of, in weight percentages,: $SiO_2$: 8.5 to 25%, $Al_2O_3$: 13 to 36.5%, $P_2O_5$: 7.5 to 33.5%, $B_2O_3$: 7 to 28%, $R_2O$: 7 to 20.5%, R'O: 0 to 21%, $TiO_2$: 0 to 6%, $ZrO_2$: 0 to 10%, PbO: 0 to 8%, where $R_2O$ represents at least one of $Na_2O$, $K_2O$, and $Li_2O$, the maximum content of $Li_2O$ being 5%; and R'O represents at least one of MgO, CaO, SrO, and BaO, within the following individual limits: MgO: 0 to 4%, CaO: 0 to 6.5%, SrO: 0 to 10%, BaO: 0 to 21%; the amount of $SiO_2$ is not less than 16% when the $B_2O_3$ content is less than 8%; and the silver content of the glass, expressed as $Ag_2O$, is not less than 0.05% by weight.

These glasses have been found to have a good combination of induced optical density on irradiation with actinic light and rapid darkening on irradiation and rapid fading when irradiation ceases. It will be understood that, as a general rule, the darkening and fading times are longer when the induced optical density is greater.

In these glasses, it is possible for $Al_2O_3$, $B_2O_3$ or $P_2O_5$ to be the largest constituent. The preferred range of glasses for opthalmic purposes is that in which the largest constituent is $Al_2O_3$ which is present in an amount of not less than 22 weight %, while the content of $P_2O_5$ does not exceed 25.5 weight % and the content of $B_2O_3$ does not exceed 24.5 weight %. Glasses within this preferred range can be formulated to have a fast response to irradiation or the removal of irradiation, coupled with physical properties which make them suitable for manufacture on a commercial scale and for use as ophthalmic lenses. For example, the liquidus temperature and viscosity of the molten glass can be chosen to suit conventional forming processes, while the hardness of the glass is appropriate for conventional grinding and polishing processes. The refractive index can be adjusted to the standard value of 1.523 which is conventional for ophthalmic use, and the glass can have a good chemical resistance or durability.

In general, it is only practicable to operate with contents of both $Al_2O_3$ and $SiO_2$ at the upper ends of the ranges set out above in cases where a high viscosity is required at the liquidus temperature, which itself is not too high, for example where the glass is to be formed into sheet glass.

Another range of glasses within the scope of the present invention is that wherein the largest constituent is $B_2O_3$ which is present in an amount of not less than 25 weight %, while the content of $Al_2O_3$ does not exceed 20 weight % and the content of $P_2O_5$ does not exceed 20 weight %.

A further range of glasses according to the present invention is that wherein the largest constituent is $P_2O_5$ which is present in an amount of not less than 21.5 weight %, while the content of $Al_2O_3$ does not exceed 26 weight % and the content of $B_2O_3$ does not exceed 17.5 weight %.

If the liquidus temperature is made relatively low, e.g. as a result of the use of a relatively large amount of $B_2O_3$ and a relatively small amount of $SiO_2$, it is important to keep a watch that the durability of the glass (e.g. as tested by absence of attack in acid and alkali solution) is still acceptable. The degree of durability which is acceptable will of course vary according to the proposed use of the glass. Thus a glass which has insufficient durability for ophthalmic use but good photochromic properties may be of value for use in instruments or other uses where it is not exposed to attack.

When the $B_2O_3$ level approaches the lower limit, i.e. is less than 8%, it is necessary that the $SiO_2$ content is at least 16% in order to ensure both the desired fast response and adequate durability for ophthalmic purposes.

$R_2O$ may be constituted solely by $K_2O$, or by a combination of two or more of $K_2O$, $Li_2O$ and $Na_2O$, or by $Na_2O$ alone. Where $R_2O$ is $Na_2O$ alone, it should preferably not exceed 14% by weight, to avoid possible problems in glass forming and durability, In the case of glasses intended for ophthalmic use, it is advantageous for the glasses to be capable of being toughened by the conventional ion exchange process, in which larger metal ions are exchanged for smaller metal ions in a surface layer of the glass to produce a compressive stress therein. The ion exchange is effected by immersing the glass in a molten salt bath. Generally potassium ions are exchanged for sodium and/or lithium ions in a bath of molten $KNO_3$, or sodium ions are exchanged for lithium ions in a molten $NaNO_3$ bath. Thus where the glass is to be chemically toughened in this way it is preferred that the $R_2O$ component should include $Na_2O$ and/or $Li_2O$. We prefer to use a mixture of alkali metal oxides, with $K_2O$ always present, and to keep each of $Na_2O$ and $Li_2O$ below 5%. The depth of penetration of the exchanged ions, and the compressive stress produced, can be varied by varying the temperature of the molten salt bath. In general, the greater the penetration, the lower the compressive stress and vice versa, so an advantageous compromise must be found by experiment.

As indicated above, the silver content of the glass, expressed as $Ag_2O$, is not less than 0.05% by weight, because with lower amounts of $Ag_2O$ it can be difficult to achieve adequate darkening. Preferably the $Ag_2O$ is not less than 0.06%.

The glass may comprise from 1 to 21% by weight R′O, where R′O represents at least one of MgO, BaO, SrO and CaO, within the following individual limits:

MgO: 0 to 4%  CaO: 0 to 6.5%  SrO: 0 to 10%
BaO: 0 to 21%

For ophthalmic use, it is convenient for the glass to have a refractive index ($n_D$), measured for light of the wavelength of the sodium D line, which is as close as possible to the standard figure of 1.523. To adjust the refractive index to this figure, additions of proportions of $TiO_2$, $ZrO_2$ and/or PbO can be of value, though care is needed to avoid problems arising from too large a quantity of one or more of these components. The amount of $TiO_2$ used should not exceed 6% by weight, in order to avoid dangers of crystallisation and unwanted colouration of the glass, the normal preferred limit being 3% by weight. $ZrO_2$ should not exceed 10 weight % in order to avoid unacceptable increases in liquidus temperature, the normal preferred limit being 7 weight %. PbO can be incorporated in quantities up to 8% by weight. Small quantities of other additives, such as $HfO_2$ (up to 3%) and ZnO (up to 6%) may be incorporated for the same purpose. Tinting agents may also be added in known manner, to provide a fixed tint in addition to the variable photochromic colouring.

As is known, the photochromic effect is produced by the silver halide crystals referred to above. Minor amounts of copper oxides assist the development of the photochromic effect, and larger amounts may be used to provide a fixed tinting effect in addition. The preferred amounts of the photochromic components, namely the silver (expressed as $Ag_2O$), the copper oxide and the halides (Cl and Br), which are expressed in accordance with the normal convention as quantities over and above the 100% total of all other components of the glass, are as follows:

$Ag_2O$: 0.06 to 0.60%  CuO: 0.005 to 1.0%
Cl+Br: 0.20 to 2.0%
Cl: 0 to 1.0%
Br: 0.08 to 1.0%

In most cases, the photochromic effect can be enhanced by heat treatment of the glass, the appropriate heat treatment schedule being primarily determined by the viscosity-temperature relationship of the particular glass. In general, the heat treatment temperature lies between the strain point and the softening point of the glass, the heat treatment time required being several hours at the lower temperature but only a few minutes at the higher temperature. At the higher temperature, however, deformation an clouding of the glass may occur, so it is preferred for convenience to use a temperature 20° to 100° C above the annealing point and a heat treatment time of 10 to 60 minutes.

The schedule may be imposed on the glass directly after forming or the glass may be annealed and cooled to room temperature before heat treatment. The cooling rate to which the glass is subjected after heat treatment is sometimes found to have an effect on the photochromic properties of the final product. This cannot be stated as a general rule, however, and must be determined by experimentation on individual glasses.

The temperature/time schedule imposed on a glass is also determined by the concentrations of photochromic agents in the glass and the photochromic property requirements of the final product. In general, the higher the levels of the components contributing to the photochromism the shorter will be the heat treatment schedule, and in some cases, the photochromism may develop during cooling from the melt or annealing of the glass. Excessively long heat treatments are generally to be avoided because they may lead to some clouding of the glass.

DETAILED DESCRIPTION OF THE INVENTION

Specific embodiments of the invention will now be described in more detail by way of example, and with reference to the following Table I, which sets out examples of glass compositions in accordance with the invention, showing their compositions on the oxide basis and the photochromic effect achieved in terms of the induced optical density (ODd) and the time in seconds taken to fade to a condition of half the total induced optical density (½ OD FT), measured with standard samples of glass 2 mm thick, in standard simulated solar conditions at air mass 2 (see Parry Moon, J. Franklin Inst., 230 (1940), pages 583–617). The induced optical density is the difference between the optical density of the glass in the fully darkened state and the optical density in the fully faded state, the optical density being defined in the conventional manner as $\log_{10} Ii/I_t$, where $Ii$ is the intensity of the incident light and $I_t$ is the intensity of the transmitted light. The induced optical density is thus a real measure of the photochromic effect and is in fact directly proportional to the number of photochromically activated silver atoms in a given volume of the glass. The time required to fade from the fully darkened condition to a condition of half the induced optical density (½ OD FT) is thus an effective measure for comparing fading times of glasses having different values of light transmission in the bleached or faded state and is comparable with the half-fading times referred to in our earlier Specification No. 1367903.

Table I also lists the temperature (HT° C) at which each of the glasses was heat treated. A standard heat treatment time of 20 minutes was used in each case, for comparative purposes only.

Finally Table I lists the refractive index $n_D$ of most of the glasses.

TABLE I

| Wt% | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $SiO_2$ | 23.1 | 23.1 | 21.7 | 20.4 | 21.2 | 17.9 | 17.0 | 17.0 | 17.0 | 22.2 | 22.5 | 21.5 | 21.2 | 20.4 |
| $Al_2O_3$ | 19.8 | 13.9 | 19.0 | 23.5 | 25.6 | 15.6 | 19.6 | 19.6 | 19.6 | 27.4 | 30.7 | 29.5 | 25.6 | 23.5 |
| $P_2O_5$ | 12.8 | 19.4 | 26.5 | 32.8 | 25.9 | 21.8 | 27.3 | 27.3 | 27.3 | 17.8 | 22.3 | 21.3 | 25.9 | 32.7 |
| $B_2O_3$ | 27.5 | 26.8 | 17.1 | 8.4 | 11.9 | 14.1 | 7.0 | 7.0 | 7.0 | 16.6 | 12.6 | 12.0 | 11.9 | 8.4 |
| $Li_2O$ | | | | | | | | | | | | | | |
| $Na_2O$ | .1 | | | | | | | | | | 8.2 | | | 13.6 |
| $K_2O$ | 15.4 | 15.2 | 14.3 | 13.5 | 14.0 | 9.8 | 9.3 | 9.3 | 9.3 | 14.6 | 2.3 | 14.2 | 14.0 | |
| MgO | 1.3 | 1.5 | 1.4 | 1.3 | 1.4 | | | | | 1.4 | 1.5 | 1.4 | 1.4 | 1.3 |
| CaO | | | | | | | | | | | | | | |
| SrO | | | | | | | | | | | | | | |
| BaO | | | | | | 20.8 | 19.8 | 19.8 | 19.8 | | | | | |
| PbO | | | | | | | | | | | | | | |
| $TiO_2$ | | | | | | | | | | | | | | |
| $ZrO_2$ | | | | | | | | | | | | | | |
| $HfO_2$ | | | | | | | | | | | | | | |
| ZnO | | | | | | | | | | | | | | |
| $Ag_2O$ | .27 | .17 | .08 | .09 | .12 | .12 | .12 | .12 | .11 | .10 | .12 | .18 | .16 | .08 |
| CuO | .013 | .029 | .031 | .035 | .035 | .036 | .033 | .045 | .040 | .029 | .038 | .030 | .035 | .045 |
| Cl | .13 | .37 | .22 | .17 | .13 | .35 | .40 | .49 | .48 | .18 | .17 | .27 | .29 | .34 |
| Br | .39 | .40 | .28 | .22 | .17 | .44 | .41 | .49 | .40 | .22 | .27 | .26 | .24 | .45 |
| ODd | .307 | .334 | .283 | .202 | .261 | .184 | .223 | .226 | .33 | .071 | .066 | .094 | .308 | .100 |
| ½ OD FT | 3 | 20 | 20 | 20 | 10 | 7 | 8.5 | 12 | 20 | 2 | 2 | 1 | 12 | 24 |
| HT° C | 625 | 520 | 620 | 550 | 660 | 635 | 640 | 630 | 630 | 705 | 705 | 750 | 640 | 610 |
| $n_D$ | 1.480 | 1.478 | 1.482 | 1.484 | 1.483 | 1.519 | 1.519 | 1.519 | 1.519 | 1.482 | 1.487 | 1.482 | 1.483 | |

| Wt% | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| $SiO_2$ | 19.9 | 20.0 | 20.0 | 20.0 | 19.6 | 19.4 | 18.8 | 18.8 | 18.0 | 20.0 | 20.8 | 20.4 | 20.1 | 19.7 |
| $Al_2O_3$ | 22.9 | 23.0 | 23.0 | 23.0 | 22.6 | 22.3 | 21.6 | 21.6 | 20.7 | 23.0 | 23.9 | 23.5 | 23.1 | 22.7 |
| $P_2O_5$ | 31.9 | 32.0 | 32.0 | 32.0 | 31.4 | 31.1 | 30.1 | 30.1 | 28.8 | 32.0 | 33.3 | 32.7 | 32.1 | 31.6 |
| $B_2O_3$ | 8.2 | 8.2 | 8.2 | 8.2 | 8.1 | 8.0 | 7.7 | 7.7 | 7.4 | 8.2 | 8.5 | 8.4 | 8.3 | 8.1 |
| $Li_2O$ | | | | | | | | | | | | | | |
| $Na_2O$ | | | | | | | | | | | 4.8 | 5.4 | | |
| $K_2O$ | 13.1 | 13.2 | 13.2 | 13.2 | 12.9 | 12.8 | 12.4 | 12.4 | 11.8 | 13.2 | 7.4 | 8.3 | 9.1 | 10.0 |
| MgO | 3.9 | | | | | | | | | | | 1.3 | 1.3 | 1.3 |
| CaO | | 3.6 | 3.6 | 3.6 | 5.3 | | | | | 3.6 | | | | |
| SrO | | | | | | 6.5 | 9.4 | | | 3.6 | | | | |
| BaO | | | | | | | | | | | | | | |
| PbO | | | | | | | | | | | | | | |
| $TiO_2$ | | | | | | | | 9.3 | 13.3 | | | | | |
| $ZrO_2$ | | | | | | | | | | | | | | |
| $HfO_2$ | | | | | | | | | | | | | | |
| ZnO | | | | | | | | | | | | | | |
| $Ag_2O$ | .07 | .08 | .08 | .07 | .07 | .07 | .07 | .08 | .07 | .09 | .15 | .09 | .07 | .09 |
| CuO | .043 | .043 | .045 | .036 | .045 | .041 | .040 | .043 | .043 | .047 | .036 | .041 | .038 | .039 |
| Cl | .17 | .24 | .41 | .40 | .34 | .27 | .25 | .30 | .31 | .28 | .30 | .25 | .30 | .29 |
| Br | .21 | .27 | .46 | .28 | .33 | .34 | .35 | .32 | .34 | .34 | .35 | .35 | .35 | .38 |
| ODd | .281 | .217 | .283 | .243 | .200 | .187 | .190 | .146 | .181 | .294 | .203 | .231 | .238 | .214 |
| ½ OD FT | 30 | 13.5 | 15 | 10 | 16 | 10 | 18 | 12 | 33 | 15 | 18 | 18 | 33 | 24 |
| HT° C | 665 | 645 | 645 | 645 | 630 | 610 | 615 | 610 | 610 | 680 | 670 | 550 | 610 | 610 |
| $n_D$ | 1.478 | 1.491 | 1.491 | 1.491 | 1.491 | 1.499 | 1.494 | 1.498 | 1.507 | 1.491 | 1.485 | 1.485 | 1.486 | 1.486 |

| Wt% | 29 | 30 | 31 | 32 | 33 | 34 | 35 | 36 | 37 | 38 | 39 | 40 | 41 | 42 |
|---|---|---|---|---|---|---|---|---|---|---|---|---|---|---|
| $SiO_2$ | 20.3 | 20.6 | 20.7 | 19.9 | 20.2 | 20.6 | 23.4 | 23.1 | 23.2 | 22.9 | 23.1 | 23.0 | 23.5 | 17.0 |
| $Al_2O_3$ | 23.3 | 23.7 | 23.8 | 22.9 | 23.3 | 23.7 | 19.0 | 19.0 | 19.2 | 18.8 | 19.0 | 19.3 | 19.3 | 19.6 |
| $P_2O_5$ | 32.5 | 32.9 | 33.2 | 31.9 | 32.4 | 33.0 | 12.5 | 12.3 | 12.4 | 12.2 | 12.3 | 12.3 | 12.5 | 27.3 |
| $B_2O_3$ | 8.3 | 8.5 | 8.5 | 8.2 | 8.3 | 8.5 | 27.0 | 26.8 | 26.9 | 26.5 | 26.8 | 26.6 | 27.2 | 7.0 |
| $Li_2O$ | | | | | 0.6 | | | | | | | | 0.38 | |
| $Na_2O$ | 4.0 | 6.9 | 8.4 | 4.6 | 7.5 | 4.9 | | | | | | | | |
| $K_2O$ | 10.3 | 6.2 | 4.1 | 11.2 | 7.1 | 7.4 | 15.4 | 15.2 | 15.3 | 15.1 | 15.2 | 15.1 | 15.5 | 9.3 |
| MgO | 1.3 | 1.3 | 1.3 | 1.3 | 1.3 | 1.4 | 1.5 | 1.5 | 1.5 | 1.5 | 1.5 | 1.5 | 1.5 | |
| CaO | | | | | | | | | | | | | | |
| SrO | | | | | | | | | | | | | | |
| BaO | | | | | | | | | | | | | | 19.8 |
| PbO | | | | | | | | | | | | | | |
| $TiO_2$ | | | | | | | | 1.0 | 2.0 | | | | | |
| $ZrO_2$ | | | | | | | | | | 1.54 | 3.0 | | | |
| $HfO_2$ | | | | | | | | | | | | 2.6 | | |
| ZnO | | | | | | | | | | | 2.0 | | | |
| $Ag_2O$ | .06 | .08 | .08 | .07 | .06 | .08 | .15 | .15 | .12 | .10 | .13 | .12 | .15 | .076 |
| CuO | .044 | .044 | .042 | .039 | .036 | .042 | .026 | .026 | .026 | .026 | .033 | .031 | .030 | .014 |
| Cl | .54 | .35 | .28 | .24 | .27 | .26 | .34 | .31 | .35 | .31 | .37 | .30 | .57 | .30 |
| Br | .33 | .24 | .40 | .24 | .32 | .33 | .33 | .29 | .29 | .29 | .29 | .24 | .32 | .35 |
| ODd | .271 | .226 | .170 | .279 | .275 | .172 | .127 | .118 | .041 | .043 | .142 | .051 | .175 | .143 |
| ½ OD FT | 10 | 12 | 15 | 15 | 15 | 8 | 3 | 3 | 1 | 1 | 6 | 1 | 10 | 18 |
| HT° C | 610 | 555 | 555 | 600 | 510 | 600 | 560 | 560 | 630 | 630 | 630 | 630 | 520 | 630 |
| $n_D$ | 1.485 | 1.487 | 1.486 | 1.486 | 1.487 | 1.489 | 1.4865 | 1.4915 | 1.4860 | 1.4905 | 1.4855 | 1.4850 | 1.5005 | 1.519 |

| Wt% | 43 | 44 | 45 | 46 | 47 | 48 | 49 | 50 | 51 | 52 | 53 |
|---|---|---|---|---|---|---|---|---|---|---|---|
| $SiO_2$ | 17.0 | 17.0 | 17.0 | 17.0 | 17.0 | 17.0 | 17.0 | 21.5 | 21.5 | 21.5 | 21.5 |
| $Al_2O_3$ | 19.6 | 19.6 | 19.6 | 19.6 | 19.6 | 19.6 | 19.6 | 29.5 | 29.5 | 29.5 | 29.5 |
| $P_2O_5$ | 27.3 | 27.3 | 27.3 | 27.3 | 27.3 | 27.3 | 27.3 | 21.3 | 21.3 | 21.3 | 21.3 |
| $B_2O_3$ | 7.0 | 7.0 | 7.0 | 7.0 | 7.0 | 7.0 | 7.0 | 12.0 | 12.0 | 12.0 | 12.0 |
| $Li_2O$ | | | | | | | | | | | |
| $Na_2O$ | | | | | | | | | | | |
| $K_2O$ | 9.3 | 9.3 | 9.3 | 9.3 | 9.3 | 9.3 | 9.3 | 14.2 | 14.2 | 14.2 | 14.2 |
| MgO | | | | | | | | 1.4 | 1.4 | 1.4 | 1.4 |
| CaO | | | | | | | | | | | |
| SrO | | | | | | | | | | | |
| BaO | 19.8 | 19.8 | 19.8 | 19.8 | 19.8 | 19.8 | 19.8 | | | | |
| PbO | | | | | | | | | | | |
| $TiO_2$ | | | | | | | | | | | |
| $ZrO_2$ | | | | | | | | | | | |
| $HfO_2$ | | | | | | | | | | | |

TABLE I-continued

| | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|
| ZnO | | | | | | | | | | | | | | | |
| $Ag_2O$ | .09 | .24 | .26 | .32 | .35 | .16 | .10 | .37 | .56 | .31 | .24 | | | | |
| CuO | .040 | .044 | .046 | .038 | .041 | .16 | .16 | .038 | | .038 | .039 | | | | |
| Cl | .33 | .19 | .19 | .48 | .50 | .44 | .44 | .26 | .21 | .35 | .12 | | | | |
| Br | .30 | .41 | .40 | .18 | .49 | .10 | .09 | .18 | .18 | .09 | .23 | | | | |
| ODd | .130 | .416 | .389 | .531 | .215 | .44 | .18 | .212 | .308 | .232 | .121 | | | | |
| ½ OD FT | 20 | 25 | 20 | 80 | 35 | 24 | 15 | 2 | 2 | 2 | 1 | | | | |
| HT° C | 630 | 630 | 630 | 630 | 630 | 630 | 630 | 662 | 685 | 685 | 705 | | | | |
| $n_D$ | 1.519 | 1.519 | 1.519 | 1.519 | 1.519 | 1.519 | 1.519 | 1.482 | 1.482 | 1.482 | 1.482 | | | | |

| Wt% | 54 | 55 | 56 | 57 | 58 | 59 | 60 | 61 | 62 | 63 | 64 | 65 | 66 | 67 | 68 |
|---|---|---|---|---|---|---|---|---|---|---|---|---|---|---|---|
| $SiO_2$ | 21.5 | 21.5 | 21.4 | 17.0 | 17.0 | 21.4 | 21.4 | 21.4 | 22.9 | 22.3 | 21.8 | 21.4 | 21.2 | 20.5 | 19.9 |
| $Al_2O_3$ | 29.5 | 29.4 | 29.3 | 19.6 | 19.6 | 29.3 | 29.3 | 29.3 | 18.9 | 18.4 | 17.9 | 18.8 | 18.6 | 18.0 | 17.4 |
| $P_2O_5$ | 21.3 | 21.3 | 21.2 | 27.3 | 27.3 | 21.2 | 21.2 | 21.2 | 12.2 | 11.9 | 11.6 | 26.1 | 25.8 | 25.0 | 24.2 |
| $B_2O_3$ | 12.0 | 12.0 | 12.0 | 7.0 | 7.0 | 12.0 | 12.0 | 12.0 | 26.6 | 25.9 | 25.2 | 16.8 | 16.6 | 6.1 | 15.6 |
| $Li_2O$ | | | | | | | | | | | | | | | |
| $Na_2O$ | | | | | | | | | | | | | | | |
| $K_2O$ | 14.2 | 14.2 | 14.2 | 9.3 | 9.3 | 14.2 | 14.2 | 14.2 | 15.1 | 14.7 | 14.3 | 14.1 | 13.9 | 13.5 | 13.1 |
| MgO | 1.4 | 1.4 | 1.4 | | | 1.4 | 1.4 | 1.4 | 1.5 | 1.4 | 1.4 | 2.8 | | | |
| CaO | | | | | | | | | | | | | 3.8 | | |
| SrO | | | | | | | | | | | | | | 6.85 | |
| BaO | | | | 19.8 | 19.8 | | | | | | | | | | 9.8 |
| PbO | | .25 | .5 | | | .5 | .5 | .5 | 2.8 | 5.4 | 7.8 | | | | |
| $TiO_2$ | | | | | | | | | | | | | | | |
| $ZrO_2$ | | | | | | | | | | | | | | | |
| $HfO_2$ | | | | | | | | | | | | | | | |
| ZnO | | | | | | | | | | | | | | | |
| $Ag_2O$ | .29 | .27 | .31 | .36 | .35 | .25 | .27 | .36 | .13 | .10 | .18 | .095 | .099 | .12 | .13 |
| CuO | .19 | .038 | .044 | .16 | .18 | .035 | .075 | .038 | .030 | .032 | .030 | .038 | .036 | .044 | .039 |
| Cl | .25 | .22 | .19 | .53 | .33 | .12 | .28 | .19 | .28 | .22 | .21 | .23 | .22 | .34 | .38 |
| Br | .16 | .19 | .18 | .08 | .09 | .26 | .17 | .15 | .22 | .14 | .17 | .25 | .26 | .34 | .39 |
| ODd | .05 | .616 | .617 | .636 | .579 | .372 | .390 | .861 | 1.17 | 0.90 | 1.09 | .196 | .183 | .234 | .26 |
| ½ OD FT | 1 | 18 | 14 | 63 | 24 | 10 | 8 | 24 | 400 | 140 | 840 | 8 | 8 | 8 | 15 |
| HT° C | 705 | 725 | 720 | 640 | 640 | 745 | 735 | 720 | 580 | 570 | 600 | 645 | 645 | 645 | 615 |
| $n_D$ | 1.482 | 1.486 | 1.491 | 1.519 | 1.519 | 1.491 | 1.491 | 1.491 | 1.4815 | 1.4915 | 1.497 | 1.483 | 1.488 | 1.496 | 1.499 |

| Wt% | 69 | 70 | 71 | 72 | 73 | 74 | 75 | 76 | 77 | 78 | 79 | 80 | 81 | 82 |
|---|---|---|---|---|---|---|---|---|---|---|---|---|---|---|
| $SiO_2$ | 22.0 | 22.5 | 22.2 | 21.6 | 21.2 | 20.8 | 17.5 | 13.7 | 18.0 | 14.4 | 10.9 | 17.7 | 14.0 | 10.5 |
| $Al_2O_3$ | 19.3 | 30.7 | 30.3 | 29.5 | 28.9 | 28.4 | 32.9 | 35.5 | 29.3 | 29.2 | 29.0 | 31.6 | 33.2 | 34.7 |
| $P_2O_5$ | 26.8 | 22.3 | 22.0 | 21.4 | 21.0 | 20.6 | 22.8 | 24.7 | 21.2 | 21.1 | 21.0 | 22.0 | 23.2 | 24.3 |
| $B_2O_3$ | 17.3 | 12.7 | 12.5 | 12.1 | 11.8 | 11.6 | 11.7 | 11.4 | 16.0 | 19.9 | 23.8 | 13.4 | 14.7 | 15.9 |
| $Li_2O$ | | | | | | | | | | | | | | |
| $Na_2O$ | 11.7 | 9.8 | 11.1 | 5.4 | 6.0 | 6.6 | | | | | | | | |
| $K_2O$ | | | | 8.1 | 9.2 | 10.1 | 13.7 | 13.3 | 14.1 | 14.0 | 13.9 | 13.9 | 13.6 | 13.3 |
| MgO | 2.9 | 1.47 | 1.45 | 1.41 | 1.38 | 1.36 | 1.36 | 1.32 | 1.39 | 1.38 | 1.38 | 1.37 | 1.34 | 1.32 |
| CaO | | | | | | | | | | | | | | |
| SrO | | | | | | | | | | | | | | |
| BaO | | | | | | | | | | | | | | |
| PbO | | .5 | .5 | .5 | .5 | .5 | | | | | | | | |
| $TiO_2$ | | | | | | | | | | | | | | |
| $ZrO_2$ | | | | | | | | | | | | | | |
| $HfO_2$ | | | | | | | | | | | | | | |
| ZnO | | | | | | | | | | | | | | |
| $Ag_2O$ | .13 | .32 | .31 | .29 | .27 | .26 | .26 | .28 | .24 | .25 | .25 | .24 | .29 | .28 |
| CuO | .048 | .041 | .048 | .037 | .037 | .037 | .036 | .036 | .036 | .037 | .037 | .036 | .033 | .036 |
| Cl | .32 | .21 | .25 | .24 | .28 | .32 | .31 | .27 | .33 | .30 | .31 | .30 | .26 | .28 |
| Br | .34 | .23 | .25 | .26 | .23 | .25 | .25 | .23 | .22 | .28 | .28 | .24 | .27 | .29 |
| ODd | .10 | .184 | .228 | .319 | .336 | .453 | .152 | .199 | .115 | .13 | .144 | .119 | .135 | .122 |
| ½ OD FT | 6 | 5 | 4 | 12 | 12 | 30 | 2 | 3 | 2 | 2 | 2 | 1 | 2 | 1 |
| HT° C | 630 | 745 | 745 | 720 | 710 | 710 | 720 | 720 | 720 | 720 | 710 | 725 | 725 | 725 |
| $n_D$ | 1.487 | 1.487 | 1.489 | 1.487 | 1.488 | 1.490 | 1.484 | 1.483 | 1.483 | 1.483 | 1.483 | 1.484 | 1.485 | 1.486 |

| Wt% | 83 | 84 | 85 | 86 | 87 | 88 | 89 | 90 | 91 | 92 | 93 | 94 | 95 | 96 |
|---|---|---|---|---|---|---|---|---|---|---|---|---|---|---|
| $SiO_2$ | 11.2 | 10.7 | 10.5 | 10.2 | 9.9 | 10.4 | 10.2 | 9.7 | 9.3 | 9.4 | 9.1 | 9.4 | 9.7 | 10.1 |
| $Al_2O_3$ | 29.7 | 28.4 | 27.7 | 27.1 | 26.2 | 27.6 | 26.8 | 25.6 | 24.5 | 24.8 | 24.0 | 25.0 | 25.7 | 26.8 |
| $P_2O_5$ | 21.5 | 20.5 | 20.1 | 19.6 | 19.0 | 20.0 | 19.4 | 18.7 | 17.8 | 18.1 | 17.5 | 18.1 | 18.6 | 19.4 |
| $B_2O_3$ | 24.3 | 23.3 | 22.7 | 22.2 | 21.5 | 22.6 | 22.0 | 21.0 | 20.1 | 20.3 | 19.7 | 20.5 | 21.0 | 22.0 |
| $Li_2O$ | | | | | | | | | | | | | | |
| $Na_2O$ | 4.7 | | | | | | | | | | | | | |
| $K_2O$ | 7.1 | 13.6 | 13.3 | 13.1 | 12.6 | 13.6 | 13.5 | 13.5 | 11.8 | 13.1 | 12.6 | 12.0 | 12.3 | 12.9 |
| MgO | 1.41 | | | | | | | | | | | | | |
| CaO | | .94 | 1.53 | 2.09 | 2.89 | 1.56 | 2.17 | 3.08 | 4.43 | 3.87 | 4.61 | | 1.63 | 4.23 |
| SrO | | | | | | | | | | | | | | |
| BaO | | 2.56 | 4.17 | 5.71 | 7.89 | 4.25 | 5.93 | 8.42 | 12.1 | 10.6 | 12.61 | 15.1 | 11.1 | 4.66 |
| PbO | | | | | | | | | | | | | | |
| $TiO_2$ | | | | | | | | | | | | | | |
| $ZrO_2$ | | | | | | | | | | | | | | |
| ZnO | | | | | | | | | | | | | | |
| $Ag_2O$ | .28 | .26 | .26 | .27 | .21 | .23 | .21 | .21 | .27 | .22 | .23 | .27 | .22 | .23 |
| CuO | .038 | .038 | .038 | .038 | .038 | .038 | .038 | .038 | .038 | .038 | .038 | .038 | .038 | .038 |
| Cl | .26 | .40 | .44 | .32 | .37 | .38 | .34 | .39 | .46 | .60 | .52 | .46 | .34 | .36 |
| Br | .32 | .43 | .37 | .39 | .32 | .37 | .33 | .35 | .33 | .38 | .33 | .35 | .37 | .38 |
| ODd | .10 | .168 | .144 | .208 | .311 | .167 | .24 | .418 | .383 | .727 | .549 | .52 | .382 | .280 |
| ½ OD FT | 2 | 5 | 3 | 4 | 7 | 4 | 4 | 10 | 11 | 18 | 17 | 22 | 12 | 5 |
| HT° C | 640 | 640 | 640 | 640 | 640 | 640 | 640 | 620 | 605 | 660 | 635 | 615 | 615 | 640 |
| $n_D$ | | 1.454 | 1.491 | 1.496 | 1.515 | 1.491 | 1.496 | 1.505 | 1.519 | 1.514 | 1.519 | 1.51 | 1.507 | 1.502 |

| Wt% | 97 | 98 | 99 | 100 | 101 | 102 | 103 | 104 | 105 | 106 | 107 | 108 | 109 |
|---|---|---|---|---|---|---|---|---|---|---|---|---|---|
| $SiO_2$ | 10.4 | 9.9 | 9.9 | 9.9 | 9.9 | 9.9 | 10.35 | 9.68 | 10.12 | 10.21 | 10.30 | 10.43 | 9.38 |
| $Al_2O_3$ | 27.6 | 26.2 | 26.2 | 26.2 | 26.2 | 26.3 | 27.47 | 25.69 | 26.85 | 27.09 | 27.33 | 27.67 | 24.80 |
| $P_2O_5$ | 20.0 | 19.0 | 19.0 | 19.0 | 19.0 | 19.0 | 19.89 | 18.60 | 19.44 | 19.61 | 19.79 | 20.03 | 18.09 |
| $B_2O_3$ | 22.6 | 21.5 | 21.5 | 21.5 | 21.5 | 21.5 | 22.51 | 21.05 | 22.00 | 22.00 | 22.39 | 22.67 | 20.33 |
| $Li_2O$ | | | | | | | | | | | | | |
| $Na_2O$ | | | | | | 2.05 | 7.85 | | 4.19 | 3.88 | 3.56 | 7.85 | |
| $K_2O$ | 13.3 | 12.6 | 12.6 | 12.6 | 12.6 | 10.04 | | 14.43 | 6.37 | 5.89 | 5.40 | | 13.01 |
| MgO | | | | | | | | | | | | | |

TABLE I-continued

| | | | | | | | | | | | | | |
|---|---|---|---|---|---|---|---|---|---|---|---|---|---|
| CaO | 6.11 | 2.59 | 2.89 | 2.89 | 2.89 | 2.89 | 3.0 | 2.82 | 2.95 | 2.98 | 3.01 | 3.04 | 2.98 |
| SrO | | | | | | | | | | | | | |
| BaO | | 7.89 | 7.89 | 7.89 | 7.89 | 7.89 | 8.2 | 7.72 | 8.07 | 8.14 | 8.22 | 8.32 | 11.41 |
| PbO | | | | | | | | | | | | | |
| TiO₂ | | | | | | | | | | | | | |
| ZrO₂ | | | | | | | | | | | | | |
| ZnO | | | | | | | | | | | | | |
| Ag₂O | .28 | .27 | .20 | .17 | .21 | .26 | .29 | .22 | .26 | .26 | .29 | .26 | .26 |
| CuO | .038 | .038 | .038 | .038 | .038 | .035 | .037 | .037 | .037 | .037 | .037 | .037 | .037 |
| Cl | .40 | .38 | .50 | .29 | .38 | .60 | .43 | .39 | .49 | .49 | .55 | .34 | .65 |
| Br | .34 | .31 | .32 | .31 | .31 | .37 | .32 | .28 | .39 | .39 | .39 | .36 | .51 |
| ODd | .203 | .36 | .396 | .255 | .321 | .376 | .547 | .452 | .226 | .421 | .556 | .451 | .445 |
| ½ OD FT | 4 | 8 | 8 | 5 | 9 | 7 | 12 | 12 | 20 | 33 | 15 | 21 | 16 |
| HT° C | 640 | 640 | 640 | 649 | 640 | 640 | 680 | 610 | 660 | 680 | 680 | 680 | 625 |
| $n_D$ | 1.499 | 1.505 | 1.505 | 1.505 | 1.505 | 1.506 | 1.513 | 1.505 | 1.509 | 1.508 | 1.509 | 1.511 | 1.513 |
| Wt% | 110 | 111 | 112 | 113 | 114 | 115 | 116 | 117 | 118 | 119 | 120 | 121 | 122 | 123 |

| | 123 | 124 | 125 | 126 | 127 | | | | | | | | |
|---|---|---|---|---|---|---|---|---|---|---|---|---|---|
| SiO₂ | 9.08 | 8.81 | 9.61 | 9.53 | 10.6 | 10.2 | 10.0 | 9.8 | 9.5 | 10.0 | 9.1 | 10.0 | 9.5 | 9.5 |
| Al₂O₃ | 24.02 | 23.28 | 25.41 | 25.19 | 33.6 | 34.0 | 33.3 | 32.6 | 31.6 | 33.2 | 30.1 | 33.1 | 31.6 | 31.6 |
| P₂O₅ | 17.52 | 16.98 | 18.54 | 18.38 | 24.9 | 23.8 | 23.2 | 22.7 | 22.0 | 23.2 | 21.0 | 23.1 | 22.0 | 22.0 |
| B₂O₃ | 19.68 | 19.08 | 20.83 | 20.65 | 16.1 | 15.6 | 15.2 | 14.9 | 14.5 | 15.2 | 13.8 | 15.2 | 14.5 | 14.8 |
| Li₂O | | | | | | | | | | | | | | |
| Na₂O | | | | | | | | | | | | | | |
| K₂O | 13.01 | 12.21 | 13.33 | 13.22 | 13.5 | 13.1 | 12.8 | 12.5 | 12.1 | 13.0 | 11.5 | 12.7 | 12.1 | 12.1 |
| MgO | | | | | 1.33 | | | | | | | | | |
| CaO | 2.98 | 2.80 | 3.05 | 3.03 | | 0.9 | 1.46 | 2.00 | 2.8 | 1.46 | | 5.86 | 2.8 | 2.8 |
| SrO | | | | | | | | | | | | | | |
| BaO | 14.21 | 16.83 | 8.35 | 8.28 | | 2.45 | 4.00 | 5.48 | 7.58 | 4.0 | 14.5 | | 7.58 | 7.58 |
| PbO | | | | | | | | | | | | | | |
| TiO₂ | | | 0.87 | 1.73 | | | | | | | | | | |
| ZrO₂ | | | | | | | | | | | | | | |
| ZnO | | | | | | | | | | | | | | |
| Ag₂O | .22 | .25 | .23 | .23 | .30 | .26 | .36 | .26 | .25 | .27 | .24 | .24 | .22 | .21 |
| CuO | .037 | .037 | .037 | .037 | .038 | .308 | .038 | .038 | .038 | .038 | .038 | .038 | .038 | .038 |
| Cl | .47 | .44 | .53 | .43 | .2 | .33 | .30 | .31 | .36 | .30 | .41 | .36 | .39 | .38 |
| Br | .31 | .36 | .38 | .26 | .37 | .38 | .34 | .32 | .31 | .28 | .31 | .25 | .24 | .31 |
| ODd | .498 | .638 | .402 | .277 | .214 | .193 | .225 | .270 | .403 | .234 | .572 | .293 | .492 | .321 |
| ½ OD FT | 18 | 21 | 10 | 9 | 3 | 4 | 3 | 8 | 15 | 6 | 70 | 4 | 24 | 9 |
| HT° C | 640 | 595 | 617 | 617 | 690 | 695 | 695 | 695 | 680 | 690 | 615 | 660 | 680 | 640 |
| $n_D$ | 1.519 | 1.524 | 1.511 | 1.518 | 1.481 | 1.494 | 1.494 | 1.498 | 1.505 | 1.493 | 1.51 | 1.501 | 1.505 | 1.505 |
| Wt% | 124 | 125 | 126 | 127 | 128 | 129 | 130 | 131 | 132 | 133 | 134 | 135 | 136 | 137 | 138 | 139 | 140 |

| | 128 | 129 | 130 | 131 | | | | | | | | | |
|---|---|---|---|---|---|---|---|---|---|---|---|---|---|
| SiO₂ | 9.5 | 9.5 | 9.75 | 9.31 | | | | | | | | | |
| Al₂O₃ | 31.6 | 31.6 | 32.4 | 30.92 | | | | | | | | | |
| P₂O₅ | 22.0 | 22.0 | 22.6 | 21.59 | | | | | | | | | |
| B₂O₃ | 14.5 | 14.5 | 14.8 | 14.17 | | | | | | | | | |
| Li₂O | | | | | | | | | | | | | |
| Na₂O | | 1.97 | 6.73 | | | | | | | | | | |
| K₂O | 12.1 | 9.98 | 6.73 | 13.87 | | | | | | | | | |
| MgO | | | | | | | | | | | | | |
| CaO | 2.8 | 2.78 | 2.84 | 2.72 | | | | | | | | | |
| SrO | | | | | | | | | | | | | |
| BaO | 7.58 | 7.59 | 7.78 | 7.43 | | | | | | | | | |
| PbO | .05 | | | | | | | | | | | | |
| TiO₂ | | | | | | | | | | | | | |
| ZrO₂ | | | | | | | | | | | | | |
| ZnO | | | | | | | | | | | | | |
| Ag₂O | .21 | .24 | .22 | .22 | | | | | | | | | |
| CuO | .038 | .037 | .037 | .037 | | | | | | | | | |
| Cl | .38 | .40 | .27 | .39 | | | | | | | | | |
| Br | .31 | .30 | .35 | .29 | | | | | | | | | |
| ODd | .403 | .335 | .167 | .545 | | | | | | | | | |
| ½ OD FT | 15 | 12 | 14 | 45 | | | | | | | | | |
| HT° C | 640 | 626 | 627 | 617 | | | | | | | | | |
| $n_D$ | 1.505 | 1.508 | 1.513 | 1.506 | | | | | | | | | |
| Wt% | 128 | 129 | 130 | 131 | 132 | 133 | 134 | 135 | 136 | 137 | 138 | 139 | 140 |

| | 132 | 133 | 134 | 135 | 136 | 137 | 138 | 139 | 140 |
|---|---|---|---|---|---|---|---|---|---|
| SiO₂ | 17.6 | 17.2 | 9.6 | 13.6 | 16.5 | 10.1 | 16.1 | 21.1 | 18.4 | 17.0 | 16.6 | 18.7 | 13.1 |
| Al₂O₃ | 29.3 | 28.6 | 32.0 | 28.7 | 26.7 | 30.3 | 27.1 | 28.8 | 29.5 | 27.9 | 32.8 | 22.1 | 32.4 |
| P₂O₅ | 11.1 | 10.8 | 18.5 | 13.7 | 7.9 | 14.6 | 14.2 | 20.9 | 13.6 | 14.6 | 22.9 | 18.6 | 22.6 |
| B₂O₃ | 17.1 | 16.7 | 21.0 | 16.1 | 19.5 | 21.9 | 14.2 | 11.8 | 13.4 | 13.9 | 7.0 | 10.5 | 11.0 |
| Li₂O | 1.5 | 1.5 | | | | | | | 1.4 | 1.4 | 0.66 | | 3.0 |
| Na₂O | | | 3.3 | | | 5.7 | | | | | 3.73 | | |
| K₂O | 10.5 | 12.5 | 5.1 | 13.3 | 14.1 | 5.4 | 13.7 | 13.9 | 9.7 | 9.7 | 5.69 | 12.3 | 5.1 |
| MgO | | | | | | | | | | | | | |
| CaO | 3.5 | 3.4 | 2.8 | 3.1 | 3.2 | 3.2 | 3.1 | .95 | | 3.2 | 2.9 | 4.5 | 2.8 |
| SrO | | | | | | | | | | | | | |
| BaO | 9.5 | 9.3 | 7.7 | 8.3 | 8.8 | 8.8 | 8.6 | 2.6 | 14.1 | 12.3 | 7.8 | 12.3 | 7.8 |
| PbO | | | | | | | | | | | | | |
| TiO₂ | | | | | 1.26 | | 1.23 | | | | | .91 | 0.89 |
| ZrO₂ | | | | | 1.95 | | 1.89 | | | | | | 1.36 |
| HfO₂ | | | | | | | | | | | | | |
| ZnO | | | | | | | | | | | | | |
| Ag₂O | 0.33 | 0.33 | .31 | .40 | .29 | .33 | .26 | .20 | 0.26 | 0.25 | 0.22 | 0.25 | .26 |
| CuO | .035 | .035 | .036 | .029 | .036 | .037 | .03 | .038 | .03 | .03 | .037 | .035 | .036 |
| Cl | 0.46 | 0.45 | .48 | .45 | .44 | .47 | .49 | .48 | .57 | .58 | 0.43 | 0.6 | .37 |
| Br | 0.26 | 0.25 | .38 | .27 | .26 | .39 | .30 | .27 | .28 | .26 | 0.32 | 0.29 | .30 |
| ODd | .53 | .90 | .208 | 1.07 | .71 | .57 | .96 | .4 | .51 | .762 | .26 | .642 | .232 |
| ½ OD FT | 15 | 27 | 27 | 36 | 24 | 18 | 60 | 14 | 24 | 18 | 30 | 54 | 6 |
| HT° C | 620 | 620 | 700 | 670 | 660 | 680 | 660 | 670 | 630 | 620 | 640 | 610 | 650 |
| $n_D$ | 1.523 | 1.522 | 1.511 | 1.524 | 1.528 | 1.517 | 1.524 | 1.518 | 1.518 | 1.524 | 1.519 | 1.522 | 1.530 |
| Wt% | 141 | 142 | 143 | 144 | 145 | 146 | 147 | 148 | 149 | 150 | 151 | 152 | 153 |

| | 141 | 142 | 143 | 144 | 145 | 146 | 147 | 148 | 149 | 150 | 151 | 152 | 153 |
|---|---|---|---|---|---|---|---|---|---|---|---|---|---|
| SiO₂ | 15.9 | 17.3 | 8.5 | 17.91 | 18.5 | 13.57 | 13.20 | 9.2 | 22.21 | 8.8 | 9.36 | 8.5 | 20.8 |
| Al₂O₃ | 28.3 | 28.3 | 27.8 | 13.03 | 36.5 | 33.61 | 29.46 | 24.5 | 27.36 | 28.0 | 33.98 | 29.4 | 28.4 |
| P₂O₅ | 20.8 | 14.9 | 16.5 | 21.76 | 25.5 | 23.48 | 14.24 | 17.7 | 15.77 | 17.0 | 17.98 | 20.5 | 20.6 |

TABLE I-continued

| | | | | | | | | | | | | |
|---|---|---|---|---|---|---|---|---|---|---|---|---|
| $B_2O_3$ | 9.8 | 14.1 | 18.7 | 16.68 | 8.0 | 11.40 | 17.46 | 20.1 | 18.60 | 19.0 | 20.35 | 13.5 | 11.6 |
| $Li_2O$ | 1.3 | 1.4 | | | 2.2 | 3.79 | 3.04 | | | | | | |
| $Na_2O$ | | | | | | | | | | | 3.23 | | 6.6 |
| $K_2O$ | 10.1 | 11.0 | 15.0 | 9.82 | 9.3 | 3.22 | 4.07 | 18.5 | 14.61 | 12.1 | 4.91 | 12.2 | 11.4 |
| MgO | | | | | | | | | 1.44 | | | | |
| CaO | | 3.3 | 2.6 | | | 2.85 | 3.13 | 2.7 | | 2.2 | 2.73 | 4.24 | |
| SrO | | | | | | | | | | | | | |
| BaO | 11.9 | 8.9 | 16.0 | 20.08 | | 8.08 | 15.40 | 7.4 | | 16.7 | 7.46 | 11.6 | |
| PbO | | | | | | | | | | | | | .5 |
| $TiO_2$ | | .92 | | | | | | | | | | | |
| $ZrO_2$ | | | | | | | | | | 1.30 | | | |
| $HfO_2$ | | | | | | | | | | | | | |
| ZnO | | | | | | | | | | | | | |
| $Ag_2O$ | .26 | .24 | .24 | 0.12 | .29 | .35 | .31 | .27 | .12 | .23 | .25 | .19 | .26 |
| CuO | .032 | .032 | .032 | 0.03 | .037 | .03 | .03 | .035 | .03 | .035 | .03 | .038 | .037 |
| Cl | .42 | .46 | .58 | 0.43 | .23 | .44 | .44 | .62 | .38 | .79 | .24 | .49 | .32 |
| Br | .29 | .26 | .48 | 0.41 | .19 | .36 | .34 | .55 | .31 | .44 | .32 | .29 | .25 |
| ODd | .622 | .646 | .959 | 0.315 | .11 | .108 | .403 | .721 | .09 | .83 | .08 | .621 | .453 |
| ½ OD FT | 27 | 27 | 185 | 18 | 4 | 3 | 12 | 72 | 3 | 21 | 2 | 210 | 30 |
| Ht° C | 640 | 580 | 585 | 680 | 700 | 660 | 660 | 610 | 690 | 660 | 660 | 700 | 710 |
| $n_D$ | 1.521 | 1.523 | 1.521 | | 1.492 | | | 1.505 | 1.482 | 1.525 | | 1.520 | 1.490 |
| Wt% | 154 | 155 | 156 | 157 | 158 | 159 | 160 | 161 | 162 | 163 | 164 | 165 | 166 |
| $SiO_2$ | 9.5 | 17.3 | 17.1 | 16.3 | 14.1 | 14.4 | 9.4 | 12.0 | 13.3 | 17.3 | 17.2 | 13.6 | 13.1 |
| $Al_2O_3$ | 26.1 | 30.7 | 30.4 | 29.0 | 27.3 | 27.5 | 26.0 | 26.4 | 27.4 | 28.4 | 27.0 | 28.7 | 32.5 |
| $P_2O_5$ | 16.7 | 14.9 | 14.7 | 14.0 | 12.2 | 19.9 | 16.7 | 19.1 | 17.6 | 14.9 | 14.8 | 13.7 | 22.7 |
| $B_2O_3$ | 20.5 | 14.2 | 14.0 | 13.3 | 19.8 | 17.8 | 20.4 | 19.3 | 17.6 | 14.2 | 14. | 16.1 | 11.1 |
| $Li_2O$ | | 2.1 | 2.1 | 1.3 | | | | | | 1.7 | 1.4 | | .66 |
| $Na_2O$ | | | | | | 3.6 | | 2.1 | 2.8 | | | | 3.71 |
| $K_2O$ | 13.1 | 8.8 | 9.8 | 9.3 | 13.2 | 5.4 | 13.1 | 10.4 | 9.5 | 9.9 | 9.8 | 13.3 | 5.64 |
| MgO | | | | | | | | | | | | | |
| CaO | 3.0 | 3.3 | 3.2 | | 3.1 | 3.0 | 3.0 | 2.9 | 3.2 | | 3.3 | 3.1 | 2.9 |
| SrO | | | | | | | | | | | | | |
| BaO | 8.2 | 8.9 | 8.8 | 16.8 | 8.4 | 8.3 | 8.2 | 7.9 | 8.6 | 12.5 | 12.5 | 8.3 | 7.8 |
| PbO | | | | | | | | | | | | | |
| $TiO_2$ | 3.0 | | | | | | 2.54 | | | .95 | | 1.20 | |
| $ZrO_2$ | | | | | | | .68 | | | | | 1.84 | |
| $HfO_2$ | | | | | | | | | | | | | |
| ZnO | | | | | | | | | | | | | |
| $Ag_2O$ | .39 | .28 | .25 | .25 | .27 | .25 | .30 | .26 | .35 | .27 | .30 | .50 | .23 |
| CuO | .034 | .036 | .037 | .033 | .034 | .037 | .035 | .039 | .037 | .030 | .030 | .029 | .037 |
| Cl | .51 | .55 | .44 | .38 | .60 | .47 | .43 | .40 | .53 | .40 | .50 | .40 | .49 |
| Br | .53 | .32 | .26 | .26 | .32 | .40 | .25 | .36 | .29 | .24 | .30 | .25 | .40 |
| ODd | .662 | .403 | .581 | .736 | .637 | .12 | .687 | .29 | .55 | .568 | .551 | 1.0 | .437 |
| ½ OD FT | 18 | 12 | 24 | 114 | 30 | 5 | 12 | 12 | 21 | 18 | 24 | 36 | 10 |
| HT° C | 660 | 610 | 590 | 610 | 665 | 640 | 670 | 640 | 670 | 585 | 655 | 620 | 585 |
| $n_D$ | 1.523 | 1.523 | 1.523 | 1.523 | 1.524 | 1.509 | 1.522 | 1.508 | 1.512 | 1.520 | 1.523 | 1.524 | 1.514 |
| Wt% | 167 | 168 | 169 | 170 | 171 | 172 | 173 | | | | | | |
| $SiO_2$ | 13.8 | 21.4 | 9.57 | 9.91 | 9.5 | 8.9 | 8.9 | | | | | | |
| $Al_2O_3$ | 30.9 | 29.3 | 25.30 | 31.94 | 26.3 | 25.5 | 19.2 | | | | | | |
| $P_2O_5$ | 14.9 | 21.1 | 18.46 | 11.15 | 16.7 | 14.3 | 17.2 | | | | | | |
| $B_2O_3$ | 18.3 | 12.0 | 20.74 | 21.48 | 20.6 | 19.2 | 22.3 | | | | | | |
| $Li_2O$ | 2.1 | 0.7 | | | | | | | | | | | |
| $Na_2O$ | | | | | | | | | | | | | |
| $K_2O$ | 7.7 | 14.0 | 13.27 | 13.69 | 16.5 | 12.3 | 12.4 | | | | | | |
| MgO | | 1.4 | 1.31 | | | | | | | | | | |
| CaO | 3.3 | | 3.04 | 3.14 | 2.8 | 2.8 | 2.8 | | | | | | |
| SrO | | | | | | | | | | | | | |
| BaO | 8.97 | | 8.32 | 8.58 | 7.6 | 16.97 | 17.1 | | | | | | |
| PbO | | | | | | | | | | | | | |
| $TiO_2$ | | | | | | | | | | | | | |
| $ZrO_2$ | | | | | | | | | | | | | |
| $HfO_2$ | | | | | | | | | | | | | |
| ZnO | | | | | | | | | | | | | |
| $Ag_2O$ | .26 | .24 | .24 | .32 | .25 | .20 | .29 | | | | | | |
| CuO | .04 | .037 | .037 | .037 | .035 | .032 | .035 | | | | | | |
| Cl | .45 | .25 | .53 | .48 | .40 | .54 | .43 | | | | | | |
| Br | .29 | .18 | .36 | .28 | .31 | .33 | .40 | | | | | | |
| ODd | .371 | .651 | .378 | .928 | .89 | .903 | .545 | | | | | | |
| ½ OD FT | 8 | 36 | 12 | 24 | 14 | 38 | 18 | | | | | | |
| HT° C | 690 | 630 | 630 | 640 | 635 | 650 | 600 | | | | | | |
| $n_D$ | 1.524 | 1.486 | 1.507 | 1.515 | 1.505 | 1.526 | 1.522 | | | | | | |

The following Table II lists a series of photochromic glass compositions according to the invention which can be chemically toughened by ion exchange as mentioned above with the compressive stress in pounds per square inch and depth of penetration in microns achieved when the ion exchange is carried out by immersion for 16 hours in a molten $KNO_3$ bath at 470° C, as well as the photochromic properties of the toughened glasses. In the case of glasses 174, 175 and 178, the exchange is of potassium ions for sodium ions. In glass 176, potassium ions are exchanged for sodium and lithium ions. In glasses 177 and 179, potassium ions are exchanged for lithium ions. It can be seen that the chemical toughening process does not affect the photochromic properties, e.g. by comparing the properties of glass 174 with the very similar glass 71 in Table I.

TABLE II

| | Glass No. | | | | | |
|---|---|---|---|---|---|---|
| Wt% | 174 | 175 | 176 | 177 | 178 | 179 |
| $SiO_2$ | 22.3 | 10.7 | 12.0 | 13.1 | 15.0 | 15.5 |
| $Al_2O_3$ | 30.5 | 35.6 | 32.1 | 32.4 | 28.1 | 27.5 |
| $P_2O_5$ | 22.1 | 24.8 | 21.7 | 22.6 | 17.6 | 20.2 |
| $B_2O_3$ | 12.5 | 16.3 | 14.3 | 11.0 | 11.6 | 9.5 |
| $Li_2O$ | | | 1.83 | 2.0 | | 1.3 |
| $Na_2O$ | 11.1 | 4.5 | 1.4 | | 6.1 | |
| $K_2O$ | | 6.8 | 5.8 | 8.3 | 9.3 | 9.8 |
| MgO | 1.45 | 1.35 | | | | |
| CaO | | | 2.9 | 2.9 | 2.7 | |
| SrO | | | | | | |
| BaO | | | 8.0 | 7.8 | 7.4 | 16.2 |
| PbO | .5 | | | | | |

TABLE II-continued

| Wt% | Glass No. | | | | | |
|---|---|---|---|---|---|---|
| | 174 | 175 | 176 | 177 | 178 | 179 |
| $ZrO_2$ | | | | | 1.29 | |
| $TiO_2$ | | | | | .84 | |
| $Ag_2O$ | .31 | .28 | .25 | .20 | .28 | .27 |
| CuO | .048 | .036 | .037 | .037 | .037 | .035 |
| Cl | .25 | .28 | .45 | .38 | .52 | .50 |
| Br | .25 | .29 | .34 | .34 | .35 | .28 |
| Stress (p.s.i.) | 24100 | 21400 | 47400 | 23800 | 44500 | 33900 |
| Penetration ($\mu$) | 55 | 85 | 28 | 76 | 60 | 65 |
| ODd | 0.228 | 0.135 | 0.14 | 0.234 | 1.1 | 0.536 |
| ½ ODft | 4 | 4 | 4 | 15 | 20 | 35 |

The compositions listed in the Tables can be made up in the following manner. The batch is melted under oxidising or neutral conditions at a temperature in the range 1200° to 1600° C, and after cooling is annealed at a temperature between 450° and 650° C. A final heat treatment may subsequently be effected at between 20° and 100° C above the annealing point for a period of 10 to 60 minutes. The optimum heat treatment temperature range for a particular glass may be determined by a gradient furnace technique. In some cases, it may be necessary to support the glass during heat treatment to avoid sagging.

The batches can be made up from conventional glass-making raw materials, such as carbonates, meta-or ortho phosphate, nitrates and oxides. The silver and halide components may be added to the batches in the form of finely-ground silver salts and sodium or potassium halides, respectively.

Precautions are required during melting to minimise volatilisation losses of batch components. Up to 60% by weight of the halide components and 30% by weight of the silver may be lost in this way and the necessary allowances are required during batch preparation.

The glasses disclosed above have a useful combination of photochromic effect, measured as induced optical density, with speed of response to exposure to, or removal of, actinic radiation. Although in some glasses it will be seen that the induced optical density is not high, the speed of response in those glasses is particularly rapid. The glasses can be used for ophthalmic purposes and for other applications where temporary protection from actinic radiation such as sunlight is required with a return to normal transmission when the actinic radiation is absent. They may thus be used for glazing in buildings or vehicles in some circumstances.

The production of photochromic properties in a glass is associated with the formation of silver halide crystals in the glass matrix in a form in which they are sensitive to actinic radiation. Hence the glass maker is not only faced with the problem of choosing a glass composition which can be melted and formed satisfactorily in a particular commercial process, but also the problem of achieving this in a glass in which silver halide crystals will be produced in radiation-sensitive form, so as to give the glass satisfactory photochromic properties. Many suggestions have been made to explain the behaviour of the silver halide crystals in the glass matrix, and British patent specification No. 1,428,880 even suggests that in some circumstances and with certain phosphate glass compositions, the silver halide may be present in the glass matrix in non-crystalline segregation phases.

In view of the large number of components it is possible to incorporate in a glass composition, it is in practice impossible to investigate fully all the permutations and combinations of even a selected area of glass compositions such as is defined in a patent application for a simple glass composition not involving the behaviour of further additives. The problem is increased in the case of compositions where a further physical effect is produced by the addition of other additives, such as those of the present invention. We have made a large number of glasses in the course of our investigation of the composition area claimed in this application. In the examples selected from this work and listed in the Tables above to illustrate our invention, we have in particular illustrated the wide variation in composition which is possible within the defined area in terms of the major glass forming components $Al_2O_3$, $B_2O_3$ and $P_2O_5$. We have illustrated how, with this wide variation, glasses can be obtained with a good combination of induced optical density on irradiation with actinic light coupled with rapid darkening on irradiation and rapid fading when irradiation ceases.

As indicated above, we prefer to operate with $Al_2O_3$ as the major component. Examples are included to illustrate this for varying relationships of $B_2O_3$ to $P_2O_5$, i.e. from $B_2O_3$ greater than $P_2O_5$ to $B_2O_3$ equivalent to $P_2O_5$, and on to where $P_2O_5$ is greater than $B_2O_3$. We have also provided examples to indicate that it is feasible to make suitable glasses with either $B_2O_3$ or $P_2O_5$ as the major component. The examples further illustrate the possible variations within these ranges, i.e. $B_2O_3 > Al_2O_3 > P_2O_5$ and $B_2O_3 > P_2O_5 > Al_2O_3$, and $P_2O_5 > Al_2O_3 > B_2O_3$ and $P_2O_5 > B_2O_3 > Al_2O_3$.

The level of $SiO_2$ in the composition has little or no effect on the photochromic properties of the glass but does enable one to adjust the forming properties of the glass, and can, for example, be important in achieving a glass which can be easily toughened by chemical means. Hence the adjustment of silica level to accommodate changes in the other major components ($Al_2O_3$, $P_2O_5$, $B_2O_3$) is a matter of applying the ordinary skill of the glassmaker, and the knowledge of the known effects on a glass composition of such changes.

Examples are provided in Table I to exemplify the limits of the permissible ranges for the major components, but in addition examples of glasses in which the major components are not at the limits of ranges are included to help to guide the practical glass maker to those areas where the most useful glasses can be obtained and to indicate that a large number of glasses exist and have been tested to identify and prove the valuable compositional area which is the basis of this invention. The Examples are in no way intended to establish discrete areas within our broad disclosure in which the advantages of our invention are obtained but to demonstrate that glass compositions may be selected over the total area with a particular preference for selecting glasses in which $Al_2O_3$ is the major component. The selection of a suitable base glass composition must also be accompanied by selection of appropriate quantities of the photochromic additives, $Ag_2O$, CuO, Cl and Br. The possibility of varying the quantities of these additives in the same base composition is demonstrated in, e.g. Examples 43 to 49. Other variations in this composition are shown in Examples 7, 8, 9, 57 and 58. It will be seen that, in general, with an increase in the level of $Ag_2O$ there is an increase in induced optical density. It is therefore important in selecting a suitable base glass composition also to experiment with and adjust the level of photochromic additives to give a desired induced optical density in any particular glass.

As mentioned above, a final heat treatment may be effected, and there may be with some compositions a need to investigate the effect of changes in both the time and temperature of the heat treatment to cause the separation of silver halide crystals in the glass matrix so as to achieve an optimum performance from the particular glass. This can be conveniently done using a sample rod of the glass cast in a gradient furnace. Examples showing a variation in heat treatment temperature with some variation in photochromic additives while maintaining almost the same base glass composition include Examples 12, 50 to 56, 59 to 61, and 72 to 74.

Further adjustments may be needed in the level of photochromic additives and the conditions for heat treatment if a composition is further adjusted by composition changes to give a desired refractive index such as 1.523. The adjustment of a glass to the standard ophthalmic refractive index of 1.523 ± 0.001 can be seen to be feasible with the glasses of the present invention. The majority of our Examples in Table I where the index is or has been corrected to 1.523 ± 0.001 are in the area where $Al_2O_3$ is the major component in the composition, as this is the area where the combination of properties achieved has been found most advantageous for commercial scale production of ophthalmic glasses, but it will be seen that Example 173 also has such a refractive index in a glass composition in which $B_2O_3$ is the major component.

We claim:

1. A photochromic alumino-phosphate glass having silver halide crystals dispersed throughout the glass, the glass consisting essentially of, in weight percentages,: $SiO_2$: 8.5 to 25%, $Al_2O_3$: 13 to 36.5%, $P_2O_5$: 7.5 to 33.5%, $B_2O_3$: 7 to 28%, $R_2O$: 7 to 20.5%, R'O: 0 to 21%, $TiO_2$: 0 to 6%, $ZrO_2$: 0 to 10%, PbO: 0 to 8%, where $R_2O$ represents at least one of $Na_2O$, $K_2O$ and $Li_2O$, the maximum content of $Li_2O$ being 5%, and R'O represents at least one of MgO, CaO, SrO and BaO, within the following individual limits: MgO: 0 to 4%, CaO: 0 to 6.5%, SrO: 0 to 10%, BaO: 0 to 21%, the amount of $SiO_2$ is not less than 16% when the $B_2O_3$ content is less than 8%; and the silver content of the glass, expressed as $Ag_2O$, is not less than 0.05% by weight.

2. A photochromic glass according to claim 1, wherein the largest constituent is $Al_2O_3$ which is present in an amount not less than 22 weight %, while the content of $P_2O_5$ does not exceed 25.5 weight % and the content of $B_2O_3$ does not exceed 24.5 weight %.

3. A photochromic glass according to claim 1, wherein the largest constituent is $B_2O_3$ which is present in an amount not less than 25 weight %, while the content of $Al_2O_3$ does not exceed 20 weight % and the content of $P_2O_5$ does not exceed 20 weight %.

4. A photochromic glass according to claim 1, wherein the largest constituent is $P_2O_5$ which is present in an amount not less than 21.5 weight %, while the content of $Al_2O_3$ does not exceed 26 weight % and the content of $B_2O_3$ does not exceed 17.5 weight %.

5. A photochromic glass according to claim 1, wherein the silver content of the glass is not less than 0.06% by weight.

6. A photochromic glass according to claim 1, wherein $R_2O$ represents a mixture of $K_2O$ with $Na_2O$ and/or $Li_2O$, neither of $Na_2O$ or $Li_2O$ exceeding 5% by weight.

7. A photochromic glass according to claim 1, wherein $R_2O$ is $K_2O$ alone.

8. A glass according to claim 1, wherein $R_2O$ is $Na_2O$ alone, in an amount not exceeding 14% by weight.

9. A photochromic glass according to claim 1, wherein the $TiO_2$ content does not exceed 3% by weight.

10. A photochromic glass according to claim 1, wherein the $ZrO_2$ content does not exceed 7% by weight.

11. A photochromic glass according to claim 1, comprising in weight percentages expressed as quantities over and above the 100% total of all other components:
    $Ag_2O$: 0.06 to 0.60%
    CuO: 0.005 to 1.0%
    Cl + Br: 0.20 to 2.0%
    Cl: 0 to 1.0%
    Br: 0.08 to 1.0%

* * * * *

UNITED STATES PATENT AND TRADEMARK OFFICE
CERTIFICATE OF CORRECTION

PATENT NO. : 4,092,174
DATED : May 30, 1978
INVENTOR(S) : Edric Ellis et al

It is certified that error appears in the above-identified patent and that said Letters Patent are hereby corrected as shown below:

Col. 16, line 2, after "by weight" insert -- , wherein said photochromic glass further comprises, in weight percentages expressed as quantities over and above the 100% total of all other components:

| | |
|---|---|
| Cl + Br | 0.20 to 2.0% |
| Cl | 0 to 1.0% |
| Br | 0.08 to 1.0% |

Signed and Sealed this

Twenty-fourth Day of October 1978

[SEAL]

Attest:

RUTH C. MASON
*Attesting Officer*

DONALD W. BANNER
*Commissioner of Patents and Trademarks*